(12) United States Patent
Lee et al.

(10) Patent No.: US 11,841,225 B2
(45) Date of Patent: Dec. 12, 2023

(54) METHOD FOR WATER LEVEL MEASUREMENT AND METHOD FOR OBTAINING 3D WATER SURFACE SPATIAL INFORMATION USING UNMANNED AERIAL VEHICLE AND VIRTUAL WATER CONTROL POINTS

(71) Applicant: Dong-A University Research Foundation for Industry-Academy Cooperation, Busan (KR)

(72) Inventors: Jae One Lee, Busan (KR); Namsik Park, Busan (KR); Sang Min Sung, Busan (KR); Byunghee Nam, Busan (KR); Doo Pyo Kim, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 447 days.

(21) Appl. No.: 17/079,523

(22) Filed: Oct. 26, 2020

(65) Prior Publication Data

US 2022/0049956 A1    Feb. 17, 2022

(30) Foreign Application Priority Data

Aug. 13, 2020    (KR) .......................... 10-2020-0101831

(51) Int. Cl.
*G01C 13/00*    (2006.01)
*B64C 39/02*    (2023.01)
(Continued)

(52) U.S. Cl.
CPC .......... *G01C 13/004* (2013.01); *B64C 39/024* (2013.01); *G01F 23/292* (2013.01); *B64U 2101/30* (2023.01); *B64U 2201/104* (2023.01)

(58) Field of Classification Search
CPC .......... B64U 2101/30; B64U 2101/104; G01C 13/004; B64C 39/024; G01F 23/292
(Continued)

(56) References Cited

U.S. PATENT DOCUMENTS 10,337,863 B2 * 7/2019 Kumagai ............... G01C 11/02
10,527,423 B1 * 1/2020 Pavlyuk ............... G08G 1/0968
(Continued)

FOREIGN PATENT DOCUMENTS

JP    2017116305 A * 6/2017 .......... B64C 39/024
JP    2019039868 A * 3/2019 ............ B64C 39/02
(Continued)

OTHER PUBLICATIONS

Shuanggen Jin, Global Navigation Satellite Systems—Signal, Theory and Applications, Feb. 2012, pp. 183-186, 340-356 (Year: 2012).*
(Continued)

*Primary Examiner* — Stephanie E Bloss
*Assistant Examiner* — Kevin C Butler
(74) *Attorney, Agent, or Firm* — CANTOR COLBURN LLP

(57) ABSTRACT

The present disclosure relates to a method for measuring a water level by using a UAV and virtual water control points and a method for generating 3D water surface spatial information, and a UAV used therefor. According to an embodiment, an UAV for a water surface survey includes: a position measurement unit configured to receive a GPS signal and to obtain position information of the UAV; a distance measurement unit including a plurality of laser measurement devices configured to project lasers toward the water surface; and a controller configured to calculate a moving distance of the UAV, based on measurement values of the position measurement unit and the distance measurement unit.

6 Claims, 6 Drawing Sheets

(51) Int. Cl.
   *G01F 23/292* (2006.01)
   *B64U 101/30* (2023.01)
(58) Field of Classification Search
   USPC .................................................. 73/170.31
   See application file for complete search history.

(56) References Cited

U.S. PATENT DOCUMENTS

| | | | |
|---|---|---|---|
| 10,641,898 B1* | 5/2020 | Moreu Alonso | G01S 17/50 |
| 10,970,924 B2* | 4/2021 | Siddiqui | H04N 23/54 |
| 11,032,527 B2* | 6/2021 | Schick | G06T 7/521 |
| 2009/0262974 A1* | 10/2009 | Lithopoulos | G01S 17/42 |
| | | | 356/3 |
| 2018/0259330 A1* | 9/2018 | Kumagai | G01C 11/04 |
| 2018/0356221 A1* | 12/2018 | Kusumoto | G05D 9/12 |
| 2020/0232794 A1* | 7/2020 | Yanagishita | G01S 17/36 |
| 2021/0192629 A1* | 6/2021 | Tofte | H04N 5/44 |
| 2021/0372793 A1* | 12/2021 | Nikulin | G01C 15/00 |
| 2022/0026208 A1* | 1/2022 | Ito | B64D 47/08 |
| 2022/0049956 A1* | 2/2022 | Lee | G01F 23/292 |

FOREIGN PATENT DOCUMENTS

| | | | | |
|---|---|---|---|---|
| JP | 7007137 B2 * | 1/2022 | | |
| KR | 20160082886 A * | 7/2016 | | B64C 39/02 |
| KR | 101934467 B1 * | 1/2019 | | G01C 13/00 |
| KR | 101934467 B1 | 1/2019 | | |
| KR | 101986709 B1 * | 6/2019 | | B64C 39/02 |
| KR | 101986709 B1 | 6/2019 | | |
| KR | 102185898 B1 * | 12/2020 | | B64C 13/18 |
| KR | 20220072801 A * | 6/2022 | | B64C 39/02 |
| WO | WO-2018168564 A1 * | 9/2018 | | B64C 39/024 |
| WO | WO-2022034966 A1 * | 2/2022 | | B64C 39/024 |

OTHER PUBLICATIONS

Haala et al., Performance Test on UAV-Based Photogrammetric Data Collection, International Archives of the Photogrammetry, Remote Sensing and Spatial Information Sciences, vol. XXXVIII-1/C22, 2011 (Year: 2011).*

J. Vallet et al., Photogrammetric Performance of an Ultra Light Weight Swinglet "UAV", International Archives of the Photogrammetry, Remote Sensing and Spatial Information Sciences, 2011, p. 6 (Year: 2011).*

Bleier et al, SCOUT3D—An Underwater Laser Scanning System for Mobile Mapping, The International Archives of the Photogrammetry, Remote Sensing and Spatial Information Sciences, vol. XLII-2/W18, 2019, p. 6 (Year: 2019).*

G. Jozkowa et al., UAS Topographic Mapping With Velodyne LiDAR Sensor, ISPRS Annals of the Photogrammetry, Remote Sensing and Spatial Information Sciences, vol. III-1, 2016, p. 9 (Year: 2016).*

Masahiko Nagai et al., The International Archives of the Photogrammetry, Remote Sensing and Spatial Information Sciences. vol. XXXVII. Part B1. Beijing 2008, p. 8 (Year: 2008).*

Masahiko Nagai et al., UAV-Borne 3-D Mapping System by Multisensor Integration, IEEE Transactions on Geoscience and Remote Sensing, vol. 47, No. 3, Mar. 2009, p. 8 (Year: 2009).*

Bandini et al., "Measuring water level in rivers and lakes from lightweight Unmanned Aerial Vehicles," Journal of Hydrology, 2017, pp. 237-250, vol. 548.

Hyeong-Gyun Kim et al., "A Study on Measurement System for Water Volume of the Reservoir using Drone and Sensors," Journal of Internet Computing and Services, 2019, pp. 47-54.

Korean Office Action for KR Application No. 10-2020-0101831 dated Aug. 12, 2021, citing the above reference (s).

* cited by examiner

METHOD FOR WATER LEVEL MEASUREMENT AND METHOD FOR OBTAINING 3D WATER SURFACE SPATIAL INFORMATION USING UNMANNED AERIAL VEHICLE AND VIRTUAL WATER CONTROL POINTS

CROSS-REFERENCE TO RELATED APPLICATIONS

This application is based on and claims priority under 35 U.S.C. § 119 to Korean Patent Application No. 10-2020-0101831, filed on Aug. 13, 2020, in the Korean Intellectual Property Office, the disclosure of which is herein incorporated by reference in its entirety.

BACKGROUND

1. Field

The present disclosure relates to a method for surveying a water surface of a region including a river, stream, or reservoir, and more particularly, to an unmanned aerial vehicle (UAV) for a water surface survey, which can measure a water level and can shoot a water surface image, and a method for obtaining 3D water surface spatial information by using the same.

The application of the present disclosure was filed by support from the national research and development business as follows:

NATIONAL RESEARCH AND DEVELOPMENT BUSINESS SUPPORTING THE PRESENT DISCLOSURE

[Project Unique Number] 1345306743
[Project Number] 2018R1D1A1A02085675
[Related Department] Ministry of Education
[Project Management (Specialized) Agency] National Research Foundation of Korea
[Research Business Title] Individual Basic Research (Ministry of Education) (R&D)
[Research Project Title] Development of S/W for Quality Verification of Drone Image and Application of Image Correction Technique
[Contribution Rate]1/1
[Lead Institute] DONG-A UNIVERSITY
[Research Period] Nov. 1, 2019-Oct. 31, 2020

2. Description of the Related Art

Water quality information of a stream, lake, or reservoir, such as water quality, water level, water temperature, etc., is periodically measured to manage the stream, lake, or reservoir. In particular, methods for measuring a water level includes a method of directly measuring and a method of using a staff gauge. The direct measurement method refers to a method whereby a person directly goes to a stream or lake by boat and measures a level of water at a specific point, and the staff gauge method refers to a method of measuring a water level by reading on the scale of a graduated rod or structure which is installed in a stream or reservoir to measure a water level.

However, such manual measurement methods require manpower and thus there is a problem that much time and cost are required to provide manpower, and particularly, in the case of a dangerous place where it is impossible for workers to survey, there is a problem that it is difficult to measure a water level.

To solve these problems, researches for establishing topographical data and water level data by utilizing an unmanned aerial vehicle (UAV) such as a drone are ongoing recently. The UAV has a camera mounted therein to shoot an image, in addition to a global positioning system (GPS) and an inertial navigation system (INS) sensor for obtaining position information and posture information, so that topography can be photographed and modeled rapidly.

FIG. 1 illustrates an exemplary topography photographing method using a UAV. An UAV 100 such as a drone shoots pictures P of the ground surface at predetermined time intervals or at predetermined distance intervals while flying above the ground surface through multiple paths having overlap, and generates an image of an entire region by matching the plurality of pictures P shot in this way.

In this case, a plurality of ground control points (GCPs) are installed on the ground, so that accuracy of absolute coordinates can be enhanced, and an entire orthoimage is made by matching neighboring pictures by using interest points. In the case of the ground surface, fixed buildings or structures may be used as reference points (interest points) and a reference point may be added on the ground surface if necessary. However, in the case of the water surface, there is no fixed point and it may be difficult to recognize interest points due to reflection of light. Therefore, in the case of an image shot from the water surface, there are problems that it is not easy to match images and accuracy is low.

CITED REFERENCES

Patent Document 1: Korean Patent Registration No. 10-1986709 (registered on May 31, 2019)
Patent Document 2: Korean Patent Registration No. 10-1934467 (registered on Dec. 26, 2018)

SUMMARY

The present disclosure has been developed in order to solve the above-described problems, and an object of the present disclosure is to provide an UAV which measures a water level by projecting lasers onto a water surface, and generates an interest point (or a reference point) necessary for matching images, by using a laser, and a method for obtaining 3D water surface spatial information by using the same.

According to an embodiment of the present disclosure, an UAV for a water surface survey includes: a position measurement unit configured to receive a GPS signal and to obtain position information of the UAV; a distance measurement unit including a plurality of laser measurement devices configured to project lasers toward the water surface; and a controller configured to calculate a moving distance of the UAV, based on measurement values of the position measurement unit and the distance measurement unit.

According to an embodiment of the present disclosure, a method for surveying a water surface by using a UAV for a water surface survey includes: (a) calculating a water level based on a first distance measurement value which is obtained by photographing in a downward direction of the UAV and projecting a first laser in a vertically downward direction; (b) calculating a horizontal movement distance of the UAV, based on a second distance measurement value which is obtained by projecting a second laser toward a point distanced from a vertical-downward point of the UAV in a forward or backward direction of the UAV by a predetermined distance; and (c) moving the UAV by the calculated horizontal movement distance.

According to an embodiment of the present disclosure, the UAV can obtain a water level by projecting lasers toward the water surface, and can match images regarding the water surface and can generate 3D water surface spatial information with high accuracy by using laser points appearing on the water surface as interest points (or reference points).

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EMBODIMENTS

Figure 1:
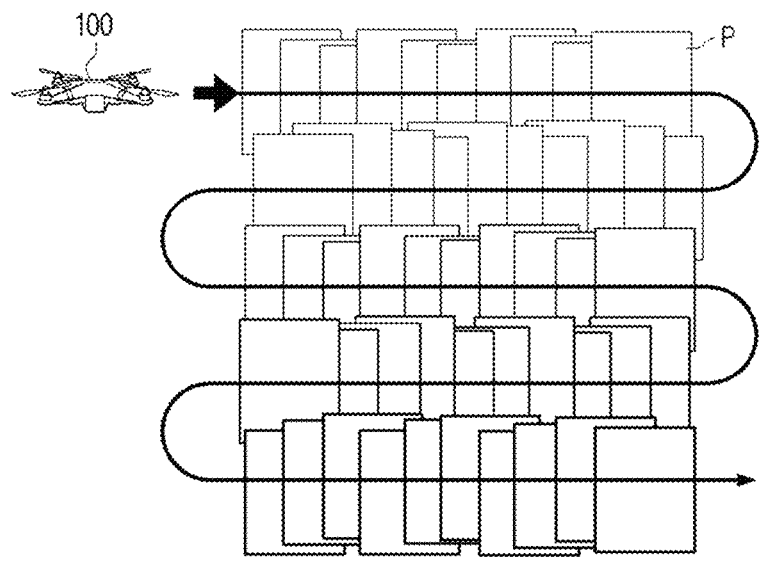
FIG. 1 is a view provided to explain a related-art method for matching images of the ground surface.

Exemplary embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" another element, the element may be directly on another element or there may be a third element therebetween. Similarly, when an element is referred to as being connected (or coupled, secured, attached) to another element, the element may be directly connected (or coupled, secured, attached) to another element or may be indirectly connected (or coupled, secured, attached) to another element with a third element being interposed therebetween. In the drawings, thickness of elements are exaggerated for easy understanding of technical features.

If the terms such as "first" and "second" are used to describe elements, these elements should not be limited by such terms. These terms are used for the purpose of distinguishing one element from another element only. The exemplary embodiments include their complementary embodiments.

In the detailed descriptions of the present disclosure, the singular forms "a," "an" and "the" are intended to include the plural forms as well, unless the context clearly indicates otherwise. It will be further understood that the terms "include," "configured with" and/or "comprise," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 2:
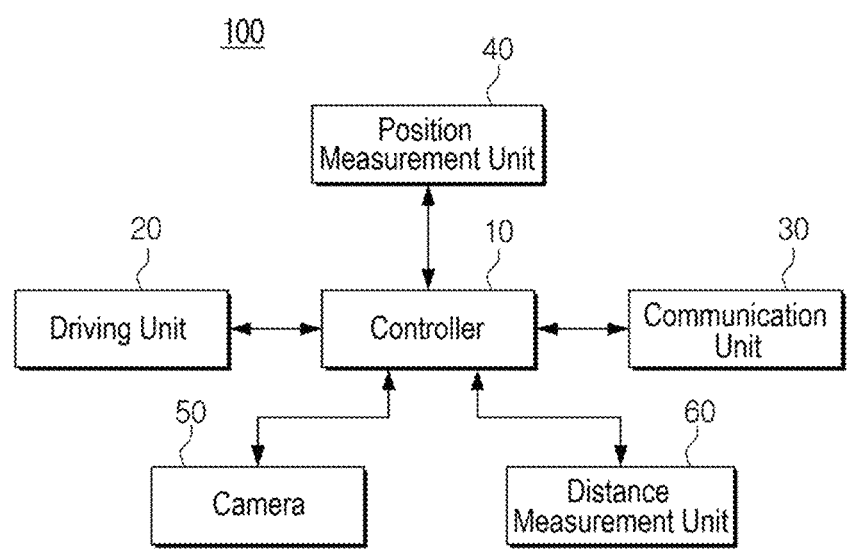
FIG. 2 is a view provided to explain an UAV according to an embodiment of the present disclosure.

FIG. 2 illustrates an UAV according to an embodiment of the present disclosure.

Referring to FIG. 2, an UAV 100 for a water surface survey (hereinafter, referred to as an "UAV" or a "flight vehicle") according to an embodiment may include a controller 10, a driving unit 20, a communication unit 30, a position measurement unit 40, a camera 50, and a distance measurement unit 60. Although not shown in the drawing, other components such as a battery for operating the UAV 100 may further be included, but have nothing to do with descriptions of the present disclosure and thus are omitted.

The controller 10 is a function unit that controls respective operations of the above-mentioned components 20, 30, 40, 50, 60. The controller 10 may transmit control signals to the components 20, 30, 40, 50, 60, respectively, to control the operations of the components 20, 30, 40, 50, 60, and may receive a measurement signal or a data signal from one component and may process the signal, or may transmit the signal to another component to control another component to perform a predetermined operation. A detailed control operation of the controller 10 will be described with descriptions of the components 20, 30, 40, 50, 60.

In an embodiment, the controller 10 may be configured with hardware such as a processor, a memory, a storage device, etc., and software and/or firmware stored in the storage device, and for example, the controller 10 may be implemented by using a micro controller (mi-com).

The driving unit 20 includes a power source for flight of the UAV 100. For example, when the UAV 100 is a flight vehicle like a drone, the driving unit 20 may include a plurality of electric motors and a propeller rotated by the electric motors. However, in an alternative embodiment, the driving unit 20 may be implemented by using other alternative power sources. The controller 10 may control the respective electric motors of the driving unit 20 to make the UAV 100 fly in forward and backward directions or leftward and right ward directions, or move up or down.

The communication unit 30 is a function unit that wirelessly communicates with a remote controller (not shown) for controlling the UAV 100. When a user transmits a user command related to flight of the flight vehicle 100 through the remote controller, the communication unit 30 may receive the command and may deliver the same to the controller 10, and the controller 10 may control flight of the flight vehicle 100 through the driving unit 20.

In an embodiment, the communication unit 30 may transmit a variety of data to a server (not shown) on the ground. For example, the communication unit 30 may periodically or aperiodically transmit, to the server on the ground, a variety of data, such as position information of the flight vehicle 100 measured by the position measurement unit 40, image data photographed by the camera 50, and distance data measured by the distance measurement unit 60.

The position measurement unit 40 may obtain position information by measuring or calculating a current position of the UAV 100. In an embodiment, the position measurement unit 40 may include a GPS receiver, and may measure a current position (for example, X, Y, Z coordinate values and height from a predetermined reference point) by receiving a GPS signal from an artificial satellite, and may deliver the position information to the controller 10 or a storage device (not shown) in the flight vehicle 100 or may transmit the position information to the ground through the communication unit 30.

The camera 50 may be to photograph a water surface, and may be mounted to face in a downward direction of the UAV 100. The camera 50 may photograph a water surface at every predetermined position under control of the controller 10, and may deliver the photographed image to the controller 10 or the storage device in the flight vehicle 100, or may transmit the image to the ground through the communication unit 30.

The distance measurement unit 60 may calculate a distance from the UAV 100 to the water surface. In an embodiment, the distance measurement unit 60 may include a plurality of laser measurement devices to calculate a distance by using a laser. Each of the laser measurement devices may project a laser pulse onto the water surface, and may measure a distance to the water surface by calculating a time taken by the laser pulse to be reflected off the water surface and returned. However, the distance measurement unit 60 may be implemented by using a device to which various alternative distance measurement techniques well known in the related-art technology are applied. Data measured by the distance measurement unit 60 may be delivered to the controller 10 or the storage device in the flight vehicle 100 or may be transmitted to the ground through the communication unit 30.

In an embodiment, when the controller 10 receives distance data from the distance measurement unit 60, the controller 10 may calculate a water level of the corresponding water surface, and may calculate a moving distance to the next photographing point of the flight vehicle, based on the distance data. This will be described below with reference to FIGS. 5 and 6.

Figure 3:
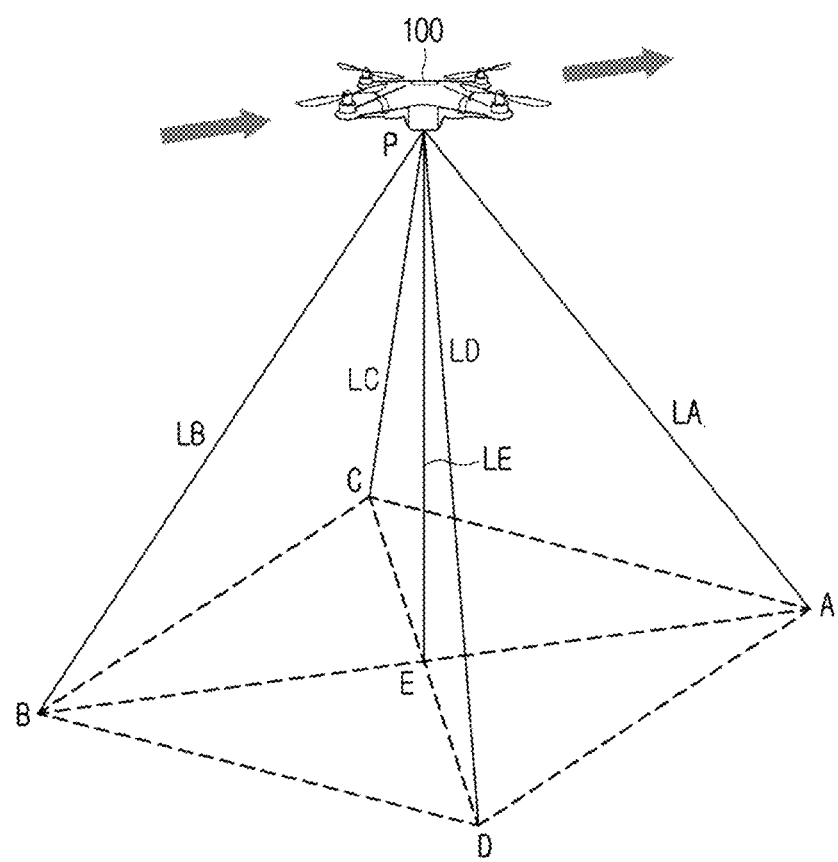
FIG. 3 is a view provided to explain lasers projected by the UAV according to an embodiment.
Figure 4:
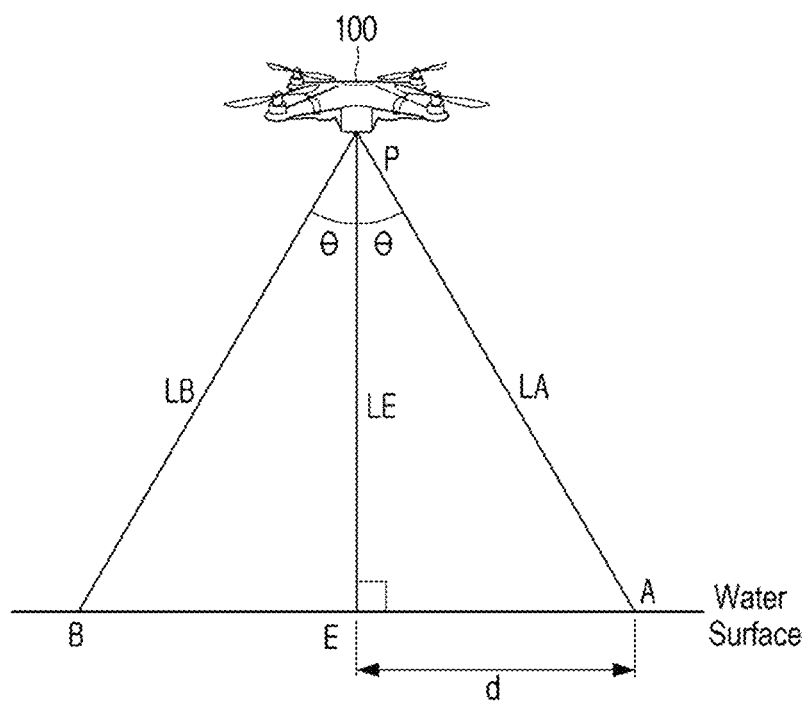
FIG. 4 is a view provided to explain lasers projected by the UAV according to an embodiment.

FIGS. 3 and 4 illustrate areas that the laser measurement devices of the distance measurement unit 60 project lasers onto. FIG. 3 is a perspective view of the laser projection area, and FIG. 4 is an elevation view on the assumption of an even water surface.

Referring to FIGS. 3 and 4, the distance measurement unit 60 of the UAV 100 may include five laser measurement devices. In the embodiment of FIG. 3, the first laser measurement device out of the five laser measurement devices may be configured to project a laser vertically downward from the UAV 100, and the second to fifth laser measurement devices may be configured to project lasers toward points distanced from the vertical-downward point by predetermine distances in forward, backward, leftward, and rightward directions of the flight vehicle 100.

For example, in FIG. 3, the UAV 100 projects a laser toward the vertical-downward point E of the UAV 100, and measures a distance LE between the UAV 100 and the vertical-downward point E. On the assumption that the flight vehicle 100 flies in the arrow direction of FIG. 3, the second laser measurement device may project a laser LA toward a point A distanced from the vertical-downward point E by a predetermined distance in the forward direction of the flight vehicle, and measures a distance LA between the flight vehicle 100 and the point A, and the third laser measurement device may project a laser toward a point B distanced from the vertical-downward point E by a predetermined distance in the backward direction of the flight vehicle, and may measure a distance between the flight vehicle 100 and the point B. In this way, the fourth and fifth laser measurement devices project lasers toward points C, D distanced from the vertical-downward point E by predetermined distances in the leftward and rightward directions, respectively, and may measure distances LC, LD. In this case, distances from the point E to the respective points A, B, C, D positioned in the forward, backward, leftward, and rightward directions may be the same as one another, or may be different from one another according to photographing height or overlap.

The respective laser measurement devices may project lasers of the visible ray spectrum of red, green, etc. Accordingly, when the camera 50 photographs the water surface while the respective laser measurement devices project lasers toward the points A, B, C, D, E, the respective points A, B, C, D, E may be displayed on the water surface in the shot pictures, and these points may serve as interest points (or reference points) when neighboring pictures are matched.

In an alternative embodiment, a laser projected by each laser measurement device to measure a distance, and a visible laser projected to match pictures may be different from each other. For example, a laser of the visible spectrum may be used as the laser for matching picture, whereas a laser of the infrared ray spectrum may be used as the laser for measuring a distance. In this case, the distance measurement unit 60 may include a picture matching laser and a distance measuring laser, separately.

In an embodiment, when the distance from the flight vehicle 100 to the vertical-downward point E is measured by the distance measurement unit 60, a water level of the corresponding point E may be calculated based on the distance. For example, if geoid height (surface) is already known by a survey and height measured by the position measurement unit 40 of the UAV 100 is measured with reference to ellipsoid height (surface), the water level of the corresponding point E may be calculated by comparing height measured by the position measurement unit 40 in the state where the flight vehicle 100 is positioned in the vertical upward direction of the point E, and the distance LE to the vertical-downward point E measured by the distance measurement unit 60. However, in an embodiment, since the water surface moves due to a flow of water and waves in a stream, sea, and a water level is frequently changed, an average of water levels measured at the same point for a predetermined period (for example, on a second basis) may be calculated.

In addition, for example, when a floodgate of a dam or an estuary dam is opened, the flight vehicle 100 may stay at a point in the air and may continuously measure a water level, and the results of measuring the water level may be combined with a later flow rate and spatial information of surroundings, and may be used as basic data for understanding an effect of a change in the water level on the environment.

In an embodiment, a moving distance d to the next point to which the flight vehicle 100 will move may be calculated based on the distance values measured by the distance measurement unit 60. For example, when the flight vehicle 100 moves to the right in FIG. 4 (that is, from the B point to the A point), the next measurement position of the flight vehicle 100 may be set to a location above the point A in the vertical upward direction. In this case, the flight vehicle 100 should move by d. Since an angle θ between the two laser measurement devices disposed to face the vertical-downward point E and the forward point A, respectively, has a fixed value, and the distance LA to the forward point A is measured through laser measurement, the distance d to move may be calculated based the equation $d=LA*\sin\theta$.

Alternatively, the next measurement position of the flight vehicle 100 may be set based on a distance by which the backward point B moves to the current vertical-downward point E, and in this case, the moving distance d may be calculated by the equation $d=LB*\sin\theta$.

In another embodiment, the distance measurement unit 60 may include two laser measurement devices. For example, the distance measurement unit 60 may include a laser measurement device which projects a laser onto the vertical-downward point E, and a laser measurement device which projects a laser onto one point of the forward point A or the backward point B. Even in this case, the UAV 100 may calculate the distance d for moving to the next point, after measuring the distance and photographing at the current point. In this case, the distance measurement unit 60 may further include a laser measurement device that projects a laser onto the left point C or the right point D in order to increase accuracy in matching pictures.

Figure 5:
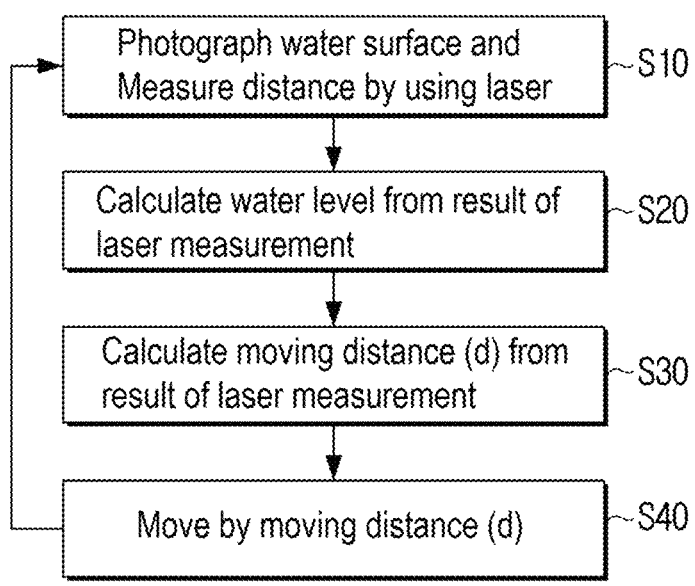
FIG. 5 is a view provided to explain a method for surveying a water surface by using the UAV according to an embodiment.

Hereinafter, a method for surveying a water surface by using the UAV 100 will be described with reference to FIGS. 5 and 6. FIG. 5 is a flowchart of an example of the method for surveying the water surface by using the UAV 100, and FIG. 6 schematically illustrates a process by which the flight vehicle 100 moves from a first point P1 to a second point P2, and exaggeratively illustrates that the water surface is not even and there exists a gradient.

First, at the first point P1, the flight vehicle 100 measures distances by photographing a downward water surface by using the camera 50, and by projecting lasers onto points including at least a vertical-downward point E1 and a forward point A1 by using laser measurement devices of the distance measurement unit 60 (step S10).

At step S20, a water level of the vertical-downward point E1 is calculated based on a result of laser measurement. In an embodiment, the water level of the point E1 may be calculated based on the distance LE1 to the vertical-downward point E1 of the flight vehicle 100. For example, when the water level is measured with reference to the geoid surface, the water level may be calculated by using a height value measured by the position measurement unit 40 and the distance LE1 measured by the distance measurement unit 60.

The step of calculating the water level (S20) may be performed by the controller 10, for example, or alternatively, the position measurement value and the distance measurement value may be transmitted to a server on the ground and the water level may be calculated by the server.

Figure 6A:
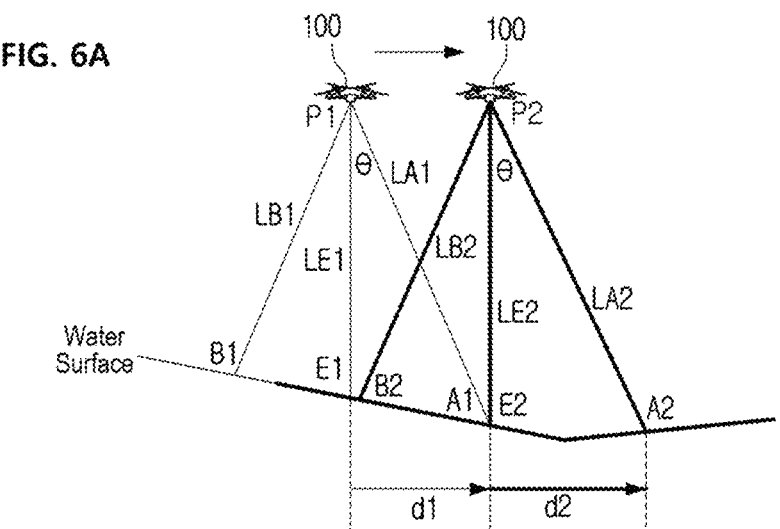
FIGS. 6A and 6B are views provided to explain a method for calculating a moving distance of the UAV according to an embodiment.

At step S30, a moving distance d1 for moving horizontally is calculated based on the result of laser measurement. Referring to FIG. 6A, at the first point P1, the flight vehicle 100 measures the distance LA1 to the forward point A1 by using the laser measurement device, and calculates the moving distance d1 by equation $d1=LA1*\sin\theta$.

The calculation of the moving distance d1 may be performed by the controller 10. The controller 10 may calculate the moving distance d1, and may set a coordinate value of a target position P2 to move, based on the moving distance d1, and then, may control the driving unit 20 to move the flight vehicle 100 to the target position. Since the controller 10 can recognize a current coordinate value from position information received from the position measurement unit 40, the controller 10 may determine whether the flight vehicle 100 moves by the moving distance d1 accurately.

The flight vehicle 100 moves by the moving distance d1 and moves to the second position P2, and then, at the second position P2, the flight vehicle 100 repeats the operation of photographing a water surface by the camera 50 and measuring a distance to the water surface by using a laser (step S10), the operation of calculating a water level from the result of laser measurement (step S20), and the operation of calculating a moving distance d2 (step S30). In this case, the moving distance d2 may be calculated by equation $d2=LA2*\sin\theta$. When the moving distance d2 is calculated, the flight vehicle 100 may set a next target position to move based on the moving distance d2, and may move to the target position (step S40), and may repeat these operations (step S10 to step 40) until the survey of a predetermined area is completed.

Data such as position information, distance information, water level information, moving distance information, coordinate value of a target position, which is measured or calculated at each step, may be transmitted to a server on the ground every time the data is generated or at predetermined intervals.

The server on the ground may generate a water surface image of the corresponding area by matching pictures obtained by photographing at the respective moving points (target points) by the flight vehicle 100. Since the points A, B, C, D, E displayed on the water surface by laser projection appear on the respective images, at least some of the points A, B, C, D, E may be used as water control points (interest points) for matching images.

Figure 6B:
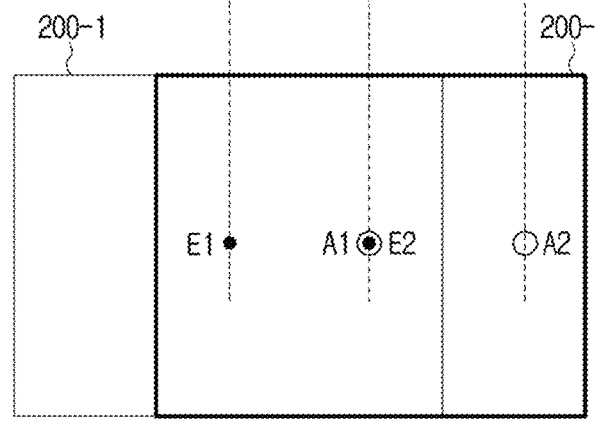

For example, in FIG. 6B, when the vertical-downward point E1 and the forward point A1 are displayed on a first image 200-1 shot at the first position P1 by lasers, and the vertical-downward point E2 and the forward point A2 are displayed on a second image 200-2 shot at the second position P2 by lasers, the two images 200-1, 200-2 may be matched and synthesized such that the forward point A1 of the first image 200-1 and the vertical-downward point E2 of the second image 200-2 overlap each other. According to the present invention as described above, since images are matched by using interest points displayed on respective shot image by lasers, a water surface image can be generated with high accuracy by matching images.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed descriptions of the present disclosure but by the appended claims, and all differences within the scope will be construed as being included in the present disclosure.

What is claimed is:

1. An UAV for a water surface survey, the UAV comprising:
   a position measurement unit configured to receive a GPS signal and to obtain position information of the UAV;
   a distance measurement unit comprising:
   a first laser measurement device configured to project a first laser toward a vertical-downward point of the UVA on a water surface in a vertical-downward direction of the UAV, and
   a second laser measurement device configured to project a second laser toward a moving point on the water surface distanced from the vertical-downward point in a forward or backward direction of the UAV by a horizontal movement distance;
   a camera configured to photograph a short water surface image including a water reference point designated on the water surface by at least one of the first laser and the second laser; and a controller configured to calculate a water level of the vertical-downward point of the UAV, based on measurement values of the position measurement unit and the distance measurement unit, configured to calculate the horizontal movement distance based on a distance measurement value measured by projecting the second laser and an angle between the first laser and the second laser, and configured to control a driving unit of the UAV to move the UAV by the horizontal movement distance such that the moving point is located in the vertical-downward direction from the UAV.

2. The UAV of claim 1, wherein the controller is configured to calculate the water level of the vertical-downward point by using a height value measured by the position measurement unit and a distance to the vertical-downward point measured by the distance measurement unit.

3. The UAV of claim 1, wherein the distance measurement unit further comprises:

a third laser measurement device configured to project a laser toward a point distanced from the vertical-downward point of the UAV in a leftward or downward direction of the UAV by a predetermined distance.

4. A method for surveying a water surface by using a UAV for a water surface survey, the method comprising:

(a) calculating a water level based on a first distance measurement value which is obtained by photographing in a downward direction of the UAV and projecting a first laser toward a vertical-downward point of the UVA on a water surface in a vertically downward direction;

(b) obtaining a second distance measurement value by projecting a second laser toward a moving point on the water surface distanced from the vertical-downward point in a forward or backward direction of the UAV by a horizontal movement distance;

(c) photographing a short water surface image including a water reference point designated on the water surface by at least one of the first laser and the second laser;

(d) calculating the horizontal movement distance of the UAV, based on the second distance measurement value which is obtained by projecting the second laser an angle between the first laser and the second laser; and (e) moving the UAV by the calculated horizontal movement distance such that the moving point is located in the vertical-downward direction from the UAV.

5. The method of claim 4, wherein the operations (a) to (e) are repeated at a position to which the UAV moves by the horizontal movement distance.

6. The method of claim 5, further comprising generating a total water surface image by matching a plurality of shot water surface images obtained in sequence by photographing at respective moving points by the UAV, wherein a projection point of the first laser and a projection point of the second laser displayed on a water surface of each of the shot water surface images are used as control points for matching the shot water surface images.

* * * * *